United States Patent Office 3,729,482
Patented Apr. 24, 1973

3,729,482
ALKYL (SUBSTITUTED INDAZOLYL-N¹-METHYL) THIOCARBONATES AND THEIR USE AS PESTICIDES
Pasquale P. Minieri, Woodside, N.Y., assignor to Tenneco Chemicals, Inc.
No Drawing. Continuation-in-part of applications Ser. No. 589,235, Oct. 25, 1966, now Patent No. 3,637,736, dated Jan. 25, 1972, and Ser. No. 689,812, Dec. 12, 1967, now Patent No. 3,641,050, dated Feb. 8, 1972. This application May 24, 1971, Ser. No. 146,488
Int. Cl. C07d 49/18
U.S. Cl. 260—310 C                8 Claims

ABSTRACT OF THE DISCLOSURE

Compounds that have the structural formula

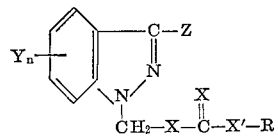

wherein one of the symbols X and X' represents sulfur and the other represents oxygen; Y represents halogen or nitro; Z represents hydrogen or halogen; R represents a lower alkyl group; and $n$ represents an integer in the range of zero to 2 can be used to control the growth of various plant and animal pests. Among the most active of these compounds are S-ethyl O-(5-chloroindazolyl-N¹-methyl)thiolcarbonate and O-ethyl S-(3-chloro-6-nitroindazolyl-N¹-methyl)dithiocarbonate.

---

This is a continuation-in-part of my copending application Ser. No. 589,235, which was filed on Oct. 25, 1966 and which is now U.S. Pat. No. 3,637,736, and my copending application Ser. No. 689,812, which was filed on Dec. 12, 1967 and which is now U.S. Pat. No. 3,641,050.

This invention relates to certain alkyl (substituted indazolyl-N¹-methyl)thiocarbonates and to the use of these compounds as pesticides.

In accordance with this invention, it has been found that certain alkyl (substituted indazolyl-N¹-methyl)thiocarbonates are effective fungicides and herbicides. These compounds may be represented by the structural formula

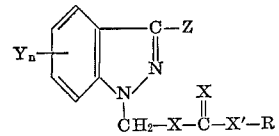

wherein one of the symbols X and X' represents sulfur and the other represents oxygen; Y represents chlorine, bromine, fluorine, iodine, or nitro; Z represents hydrogen, chlorine, bromine, fluorine, or iodine; R represents an alkyl group having from 1 to 4 carbon atoms; and $n$ represents an integer in the range of zero to 2.

Particularly effective as pesticides are the compounds having the aforementioned structural formula wherein Y represents chlorine or nitro; Z represents hydrogen or chlorine, and R represents ethyl. Illustrative of these preferred compounds are the following:

S-ethyl O-(3-chloroindazolyl-N¹-methyl)thiolcarbonate,
S-ethyl O-(5-nitroindazolyl-N¹-methyl)thiolcarbonate,
S-ethyl O-(6-nitroindazolyl-N¹-methyl)thiolcarbonate,
S-ethyl O-(3-chloro-6-nitroindazolyl-N¹-methyl) thiolcarbonate,
S-ethyl O-(5,6-dinitroindazolyl-N¹-methyl) thiolcarbonate,
S-ethyl O-(3,5dichloro indazolyl-N¹-methyl)thiolcarbonate,
S-ethyl O-(3-chloro-5,6-dinitroindazolyl-N¹-methyl) thiolcarbonate,
O-ethyl S-(3-chloroindazolyl-N¹methyl)dithiolcarbonate,
O-ethyl S-(6-nitroindazolyl-N¹-methyl)dithiocarbonate,
O-ethyl S-(3-chloro-5,6-dinitroindazolyl-N¹-methyl) dithiocarbonate,
O-ethyl S-(3-chloro-6-nitroindazolyl-N¹-methyl) dithiocarbonate,
O-ethyl S-(5-chloroindazolyl-N¹-methyl)dithiocarbonate, and the like The novel compounds may be prepared by any suitable and convenient procedure. For example, the S-alkyl O-(substituted indazolyl-N¹-methyl)thiolcarbonates can be prepared by heating the appropriate N¹-hydroxymethyl-substituted indazole or its N-amine salt with an alkyl chlorothiolformate. The reaction is ordinarily carried out in a solvent, such as benzene, toluene, pyridine, or acetone, at the reflux temperature of the reaction mixture. The N¹-hydroxymethyl substituted indazoles can be prepared by the procedure described in my copending application Ser. No. 589,235 which is now U.S. Pat. No. 3,637,736.

The compounds of this invention can be applied to a wide variety of plants and fungi to control or inhibit their growth. The locus in which pest control is to be effected can be treated with the compounds of this invention, or the compounds can be applied directly to the organisms to control or inhibit their growth.

While the alkyl (substituted indazolyl-N¹-methyl)thiocarbonates can be used as such in the control of the growth of undesirable plants and fungi, they are usually and preferably used in combination with an inert carrier that facilitates the dispensing of dosage quantities of the pesticide and assists in its absorption by the organism whose growth is to be controlled. The pesticidal compounds can be mixed with or deposited upon inert particulate solids, such as fullers' earth, talc, diatomaceous earth, hydrated calcium silicate, kaolin, and the like to form dry particulate compositions. Such compositions may if desired be dispersed in water with or without the aid of a surface-active agent. The pesticidal compounds are preferably dispensed in the form of solutions or dispersions in inert organic solvents, water, or mixtures of inert organic solvents and water or as oil-in-water emulsions. The concentration of the pesticide in the compositions may vary within wide limits and depends upon a number of factors, the most important of which are the types of organisms being treated and the rate at which the composition is to be applied. In most cases the composition contains about 0.1 percent to 85 percent by weight of one or more of the alkyl (substituted indazolyl-N¹-methyl)thiocarbonates of this invention. If desired, other pesticidal compounds may also be present in the compositions. The amount of the composition that is used is that which will provide the necessary inhibition or control of the growth of the pests.

The invention is further illustrated by the examples that follow.

EXAMPLE 1

To a mixture of 18.0 grams (0.1 mole) of N¹-hydroxymethyl-3-chloroindazole, 22.2 grams (0.22 mole) of triethylamine, and 200 ml. of benzene at a temperature between 23° C. and 32° C. was added over a period of 15 minutes a solution of 10.5 grams (0.1 mole) of ethyl chlorothiolformate in 25 ml. of benzene. The reaction mixture was heated to its reflux temperature and held at that temperature for 30 minutes. After it had cooled, it was washed with two 100 ml. portions of water. It was heated to remove sufficient benzene to reduce it to about one-fourth of its original volume. The concentrate was cooled in an ice bath and then filtered. There was obtained 7.1 grams of crystalline S-ethyl O-(3-chloroindazolyl-$N^1$-methyl)thiolcarbonate that melted at 108°–115° C.

The filtrate was evaporated to dryness. There was obtained a solid residue that was contaminated with an oily material. The residue was triturated with petroleum ether (B.P. 65–110° C.), allowed to stand for several days at room temperature, and then filtered. There was obtained 8.2 grams of a solid product. A small amount of the product melted at 102°–148° C.; the remainder melted at 148°–182° C. with decomposition.

EXAMPLE 2

Using the procedure described in Example 1, S-ethyl O-(5-chloroindazolyl-$N^1$-methyl)thiolcarbonate was prepared from $N^1$-hydroxymethyl-5-chloroindazole, triethylamine, and ethyl chlorothiolformate. This product melted at 73°–76.5° C. and contained 50.1 percent C, 4.1 percent H, 11.2 percent N, and 14.1 percent Cl (calculated, 48.9 percent C, 4.1 percent H, 10.6 percent N, and 13.1 percent Cl).

EXAMPLE 3

Using the procedure described in Example 1, S-ethyl O-(5-nitroindazolyl-$N^1$-methyl)thiolcarbonate was prepared from $N^1$-hydroxymethyl-5-nitroindazole, triethylamine, and ethyl chlorothiolformate. This product melted at 93°–101° C. and contained 47.9 percent C, 4.3 percent H, and 11.2 percent S (calculated, 47.0 percent C, 3.9 percent H, and 11.4 percent S).

EXAMPLE 4

Using the procedure described in Example 1, S-ethyl O-(6-nitroindazolyl-$N^1$-methyl)thiolcarbonate was prepared from $N^1$-hydroxymethyl-6-nitroindazole, triethylamine, and ethyl chlorothiolformate.

EXAMPLE 5

Using the procedure described in Example 1, S-ethyl O-(3-chloro-6-nitroindazolyl-$N^1$-methyl)thiolcarbonate was prepared from $N^1$-hydroxymethyl-3-chloro-6-nitroindazole, triethylamine and ethyl chlorothiolformate. This product melted at 81°–82.5° C. and contained 11.3 percent Cl, 10.1 percent S, and 13.4 percent N (calculated, 11.2 percent Cl, 10.2 percent S, and 13.3 percent N).

EXAMPLE 6

Using the procedure described in Example 1, S-ethyl O-(5,6-dinitroindazolyl-$N^1$-methyl)thiolcarbonate was prepared from $N^1$-hydroxymethyl-5,6-dinitroindazole, triethylamine, and ethyl chlorothiolformate. This compound melted at 106°–109° C. and contained 17.3 percent N (calculated, 17.2 percent N).

EXAMPLE 7

To a mixture of 21.2 grams (0.1 mole) of the potassium salt of ethyl xanthic acid and 100 ml. of acetone at room temperature was added 24.6 grams (0.1 mole) of $N^1$-chloromethyl-3-chloro-6-nitroindazole. The reaction mixture was stirred for 105 minutes while its temperature fell from 55° C. to 28° C. and then filtered. The filtrate was heated under reduced pressure to remove the acetone. There was obtained 33.2 grams of an oil. This oil was dissolved in 200 ml. of benzene. The benzene solution was washed with water and then heated to remove the benzene. There was obtained 29.9 grams of O-ethyl S-(3-chloro-6-nitroindazolyl-$N^1$-methyl)dithiocarbonate, an oil which contained 10.72 percent Cl and 19.93 percent S (calculated, 10.7 percent Cl and 19.25 percent S).

EXAMPLES 8–10

Using the procedure described in Example 7, the following compounds were prepared:

Ex. 8: O-ethyl S-(5-chloroindazolyl-$N^1$-methyl)-dithiocarbonate

Ex. 9: O-ethyl S-(3-chloroindazolyl-$N^1$-methyl)-dithiocarbonate

Ex. 10: O-ethyl S-(6-nitroindazolyl-$N^1$-methyl)-dithiocarbonate

EXAMPLE 11

Aqueous solutions were prepared by dissolving 100 mg. portions of the products of Examples 1–10 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the test compound. More dilute solutions were prepared by adding distilled water to these solutions.

EXAMPLE 12

A series of tests was carried out in which the compounds of Examples 2 and 10 were evaluated as selective herbicides. The tests were carried out by spraying seedlings of various plant species with solutions prepared by the process of Example 11 and observing the results 43 days after this treatment. A numerical scale is used in Table I to show the herbicidal activity of the test compounds. On this scale, "1" indicates no injury to the plants; "2" indicates slight injury; "3" indicates moderate injury; "4" indicates severe injury; and "5" indicates that all of the plants were killed.

TABLE I

| | Product of Ex. 2 | Product of Ex. 10 |
|---|---|---|
| Herbicide: Rate (lb./acre) | 20 | 20 |
| Plant species: | | |
| Clover | 3 | 3 |
| Soybean | 3 | 3 |
| Sugar beet | 3 | 3 |
| Cotton | 3 | 2 |
| Corn | 1 | 3 |
| Oats | 1 | 2 |
| Mustard | 3 | 2 |
| Morning glory | 1 | 2 |
| Buckwheat | 3 | 2 |
| Rye grass | 1 | 2 |
| Crab grass | 1 | 3 |
| Foxtail | 1 | 3 |

EXAMPLE 13

Separate lots of sterilized soil were inoculated with plant pathogens. The inoculated soil was placed in 4-ounce containers, and the soil in each container was drenched with 30 ml. of an aqueous fungicide solution prepared by the process of Example 11. After incubation for two days at 70° F., the amount of mycelial growth on the surface of the soil was noted. The results of these tests are given in Table II. In this table, a rating of "1" indicates that the surface of the soil was completely covered with colonies of the organism; "2" indicates that about 75 percent of the surface was covered with colonies of the organism; "3" indicates that about half of the surface was covered with colonies of the organism; "4" indicates that a few scattered colonies were present; and "5" indicates that there was no growth on the surface of the soil.

TABLE II

| | | Plant pathogens | | | |
|---|---|---|---|---|---|
| Fungicide | Rate (lb./acre) | Sclerotium rolfsii | Pythium sp. | Rhizoctonia solani | Fusarium oxysporum |
| Prod. of Ex. 2 | 300 | 5 | 4 | 2 | 1 |
| Prod. of Ex. 10 | 300 | 5 | 3 | 1 | 2 |

EXAMPLE 14

Tomato plants that were 6–8 inches tall were sprayed until the liquid dripped from the leaves with aqueous solutions prepared by the process of Example 11. When the plants had dried, they were sprayed with suspensions of the spores of tomato early blight fungus or with spores of powdery mildew of bean fungus. One week after treatment, the degree of suppression of the disease was noted. In no case was there appreciable injury to the plants. The results obtained are summarized in Table III.

TABLE III

| Fungicide | Rate (p.p.m.) | Percent control of early blight of tomatoes | Control of powdery mildew of beans |
|---|---|---|---|
| Prod. of Ex. 3 | 1,000 | 55 | Good. |
| Prod. of Ex. 6 | 1,000 | 69 | Fair. |
| Prod. of Ex. 9 | 1,000 | 43 | Do. |
| Prod. of Ex. 10 | 1,000 | 31 | Excellent. |
|  | 500 |  | Do. |

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A compound having the structural formula

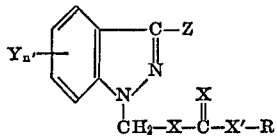

wherein one of the symbols X and X' represents sulfur and the other represents oxygen; Y represents halogen or nitro; Z represents hydrogen or halogen; R represents lower alkyl and $n'$ represents an integer in the range of 1 to 2.

2. A compound as set forth in claim 1 wherein X represents oxygen and X' represents sulfur.

3. The compound as set forth in claim 2 that is S-ethyl O - (3 - chloroindazolyl - $N^1$-methyl)thiolcarbonate.

4. The compound as set forth in claim 2 that is S-ethyl O-(5-chloroindazolyl-$N^1$-methyl)thiolcarbonate.

5. The compound as set forth in claim 2 that is S-ethyl O-(5-nitroindazolyl-$N^1$-methyl)thiolcarbonate.

6. The compound as set forth in claim 2 that is S-ethyl O - (3-chloro-6-nitroindazolyl-$N^1$-methyl)thiolcarbonate.

7. The compound as set forth in claim 1 that is O-ethyl S - (3 - chloro - 6 - nitroindazolyl - $N^1$-methyl)dithiocarbonate.

8. The compound as set forth in claim 1 that is O-ethyl S - (6 - nitroindazolyl - $N^1$ - methyl)dithiocarbonate.

References Cited

FOREIGN PATENTS

| 1,568,790 | 4/1969 | France | 260—310 C |
| 1,814,335 | 8/1969 | Germany | 260—310 C |

OTHER REFERENCES

Pozharskii et al.: J. Gen. Chem. (USSR), vol. 34, pp. 3409–11 (1964).

NATALIE TROUSOF, Primary Examiner

U.S. Cl. X.R.

71—92; 424—273